Oct. 4, 1949.　　　　E. W. VARS　　　　2,483,567
TRAILER HITCH
Filed Feb. 19, 1946　　　　　　　　　　　　7 Sheets-Sheet 1

FIG. 1

INVENTOR.
ETHAN W. VARS
BY
　　Des Jardins & Compton
HIS ATTORNEYS

Oct. 4, 1949.　　　　　E. W. VARS　　　　　2,483,567
TRAILER HITCH

Filed Feb. 19, 1946　　　　　　　　　　　7 Sheets-Sheet 2

FIG. 2

INVENTOR.
ETHAN W. VARS
BY
HIS ATTORNEYS

Oct. 4, 1949.　　　　　E. W. VARS　　　　　2,483,567
TRAILER HITCH
Filed Feb. 19, 1946　　　　　　　　　　　　　　7 Sheets-Sheet 3

INVENTOR.
ETHAN W. VARS
BY
Des Jardins & Lampton
HIS ATTORNEYS

Oct. 4, 1949.  E. W. VARS  2,483,567
TRAILER HITCH

Filed Feb. 19, 1946  7 Sheets-Sheet 4

INVENTOR.
ETHAN W. VARS
BY
HIS ATTORNEYS

Oct. 4, 1949.　　　　　E. W. VARS　　　　　2,483,567
TRAILER HITCH

Filed Feb. 19, 1946　　　　　　　　　　　　　　7 Sheets-Sheet 5

INVENTOR.
ETHAN W. VARS
BY
HIS ATTORNEYS

Oct. 4, 1949.    E. W. VARS    2,483,567
TRAILER HITCH
Filed Feb. 19, 1946    7 Sheets-Sheet 6

INVENTOR.
ETHAN W. VARS
BY
HIS ATTORNEYS

Oct. 4, 1949.  E. W. VARS  2,483,567
TRAILER HITCH
Filed Feb. 19, 1946  7 Sheets-Sheet 7

INVENTOR.
ETHAN W. VARS
BY *DesJardins & Langston*
HIS ATTORNEYS

Patented Oct. 4, 1949

2,483,567

UNITED STATES PATENT OFFICE 2,483,567

TRAILER HITCH

Ethan W. Vars, Duncannon, Pa., assignor, by mesne assignments, to George Harold Bell & Associates, York, Pa., a partnership Application February 19, 1946, Serial No. 648,591

23 Claims. (Cl. 280—33.4)

This invention relates to a trailer hitch by which a two wheeled trailer may be connected to a tractor vehicle, one mode of its adjustment causing the trailer to track with the tractor vehicle on forward motion, and the other mode of adjustment causing the trailer to track with the tractor vehicle when backing.

The invention provides a structure including a tongue pivoted to the rear of the trailer for transverse swinging movement relative to the trailer, a supporting guide for the forwardly extending reach of the tongue which provides locking formations available for use in holding the tongue aligned with the longitudinal center line of the trailer, and a locking member pivotally coupled to the forward reach of the tongue, which locking member is movable to one position to engage the locking formations of the guide to lock the tongue in alignment with the trailer, said locking member having rigid arms extending at an angle from an apex at the pivot coupling it to tongue, which arms are so positioned that when the locking member is moved out of and away from the locking formation in the guide, the ends of the arms are in position to make abutting contact, on each side of the tongue, with a tractor vehicle to which the trailer tongue is coupled, to hold the tongue aligned with the longitudinal center line of the tractor. The front end of the tongue is provided with a ball and socket connection by which it may be coupled to the rear end of a tractor vehicle for limited universal movement. On forward movements of the tractor vehicle the tongue is locked in line with the longitudinal center line of the trailer. On backward movements of the tractor vehicle the locking member is disengaged from the locking formations and the tongue is free to swing transversely of the trailer, but is held aligned with the longitudinal center line of the tractor vehicle, by reason of the abutment of the arms thereagainst.

Various refinements in the embodiment of the invention to prevent undamped yawing of the trailer and permitting quick adjustment of the mechanism for forward or backward movement are provided.

Therefore, the principal object of the invention is to provide a trailer hitch for a two wheeled trailer which is adjustable so that the trailer will track with the tractor vehicle on either forward or backward motion.

Another object of the invention is to provide a tongue which may be coupled to the rear end of a tractor vehicle and which is pivoted to the rear end of a two-wheeled trailer, the tongue being under control of an adjustable locking member having two modes of adjustment, in one of which modes of adjustment the tongue is held aligned with the longitudinal center line of the trailer, and in the other of which modes of adjustment the tongue is held aligned with the longitudinal center line of the tractor vehicle.

Another object of the invention is to provide a support guide for the forward reach of the tongue, and means pivoted to the tongue for engaging locking formations in the guide to hold the tongue aligned with the center line of the trailer.

Another object of the invention is to provide a brake-like damping means frictionally engaging the tongue and support guide to prevent excessive yawing of the trailer in backward movement.

Further objects, and objects relating to details and economies of construction will definitely appear from the detailed description to follow. In one instance, I have accomplished the object of my invention by the devices and means set forth in the following specification. My invention is clearly defined and pointed out in the appended claims. Structures, constituting preferred embodiments of my invention, are illustrated in the accompanying drawings, forming a part of this specification, in which:

In the drawings, the same reference numerals refer to the same parts throughout the several views, and the sectional views are taken looking in the direction of the arrows at the ends of the section lines.

Figure 7:
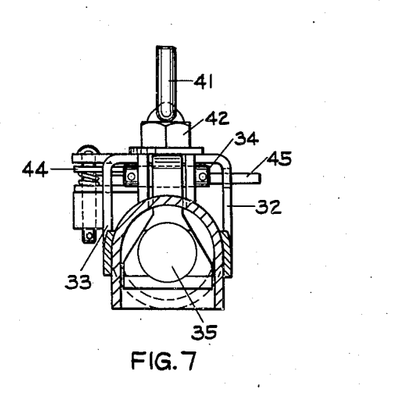
Fig. 7 is a section on the line 7—7 of Fig. 4.
Figure 8:
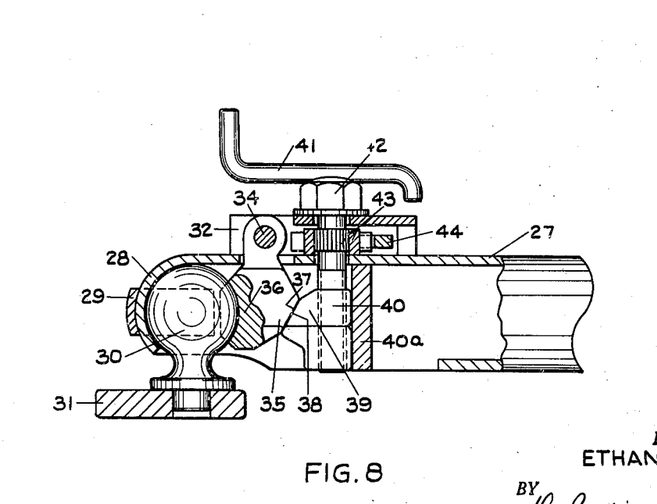
Fig. 8 is a section approximately on the line 8—8 of Fig. 4.
Figure 15:
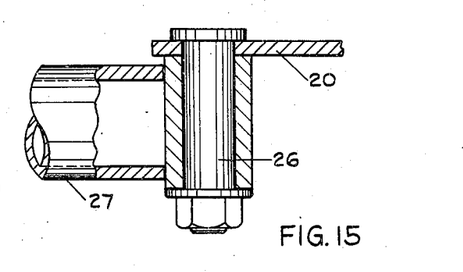
Fig. 15 is an enlarged detail of the pivot shown at the rear of the trailer in Fig. 1.

Referring to the numbered parts of the drawings, a trailer frame 20 (Fig. 1) surmounted by a body 21 (see also Fig. 2) is carried by springs 22 (Fig. 1) supported by a horizontal axle 23 positioned transversely of the trailer frame and carrying on either outer end wheels 24 and 25. Pivoted to a vertical spindle 26 (see also Fig. 15), pendent from the rear end of the trailer frame 20 in the center line thereof, is a tubular tongue 27 having a forward reach extending beneath the frame forwardly beyond the front of the trailer and having integral with the front end thereof a coupling means including a broken ball socket 28 (Fig. 8) having a reinforcing band 29 welded thereto. The ball socket 28 is broken open sufficiently at the bottom to receive a ball 30 fastened in a draw bar 31, secured to a tractor frame member on the rear end of the tractor vehicle to permit limited universal movement between the tongue and drawbar. Lugs 32 and 33 (Figs. 7 and 8), projecting upwardly from the tongue 27 which together with the interior of the tongue form a housing, carry a transverse pivot rod 34 on which swings a clapper 35 projecting downwardly into the interior of the tongue, said clapper having a formed recess 36 (Fig. 8) adapted to close the inner surface of the socket 28 sufficiently, when swung clockwise as seen in Fig. 8, to clamp the inserted ball 30. The rear end of clapper 35 has a cam surface 37, engageable by cam surface 38 of wedge 39 raised or lowered by turning screw bolt 40. Wedge 39 is prevented from turning by web 40a on the interior of the tongue. By lowering wedge 39 the clapper 35 is free to move counter-clockwise so that ball 30 may be withdrawn from socket 28, and by raising wedge 39 clapper 35 is forced clockwise into locking engagement with ball 30. The bolt head 42 has welded thereto a turning handle 41. On the shank of bolt 40 is secured a ratchet wheel 43, engageable by a spring pressed pawl 44, to prevent loosening of the bolt when the ball is engaged. This pawl has a finger piece 45 (Fig. 7) by which it may be disengaged from the ratchet teeth, when the wedge is to be released.

Figure 1:
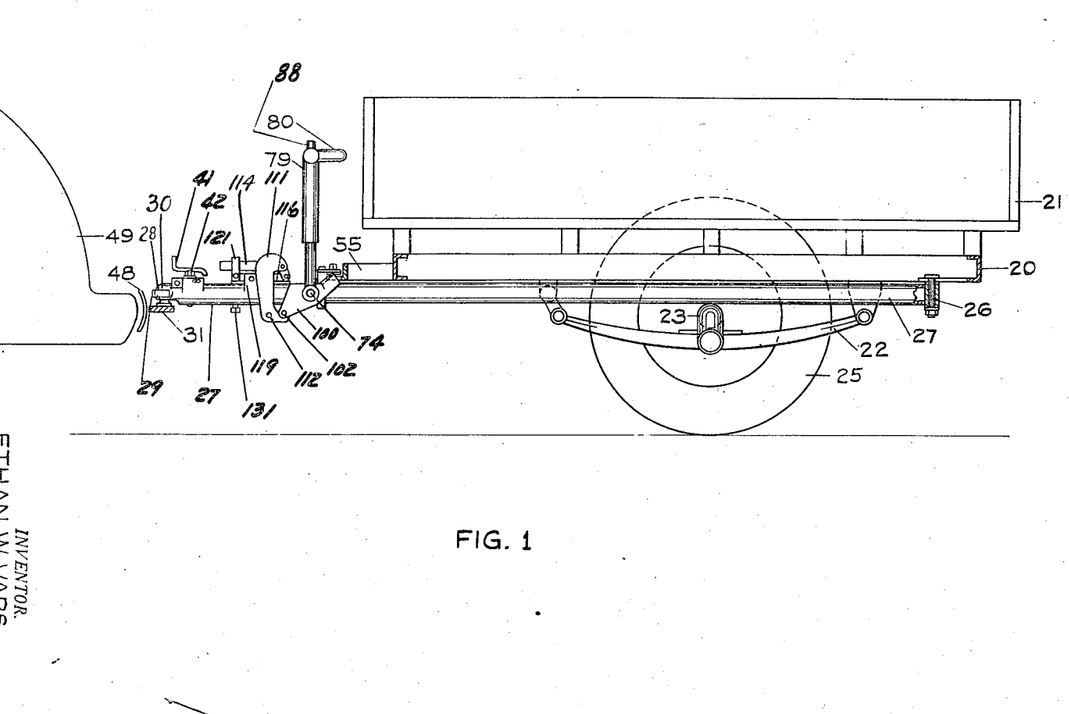
Fig. 1 is a side elevation, partly in section, of the invention as applied to the hitching of a two wheeled trailer to the rear bumper of a tractor automobile, for forward movement.
Figure 2:
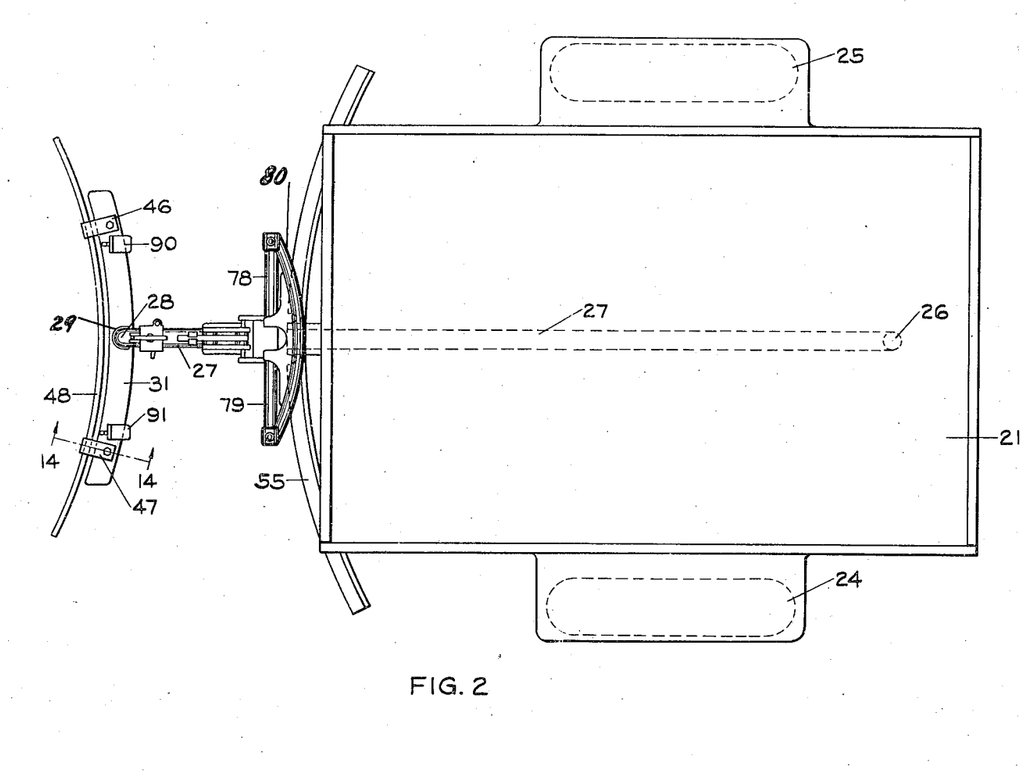
Fig. 2 is a plan view of the substance of Fig. 1.
Figure 14:
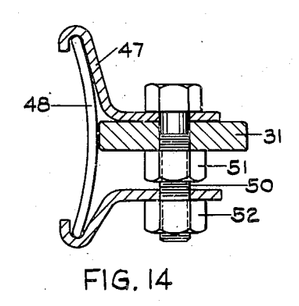
Fig. 14 is a section through Fig. 2 on the line 14—14.

Referring to Figs. 1 and 2, the drawbar 31 is shown fastened by clamps 46 and 47 (Fig. 2) to the rear bumper 48 of an automibile, which is the disclosed tractor vehicle, the ball and socket connection being on the longitudinal center line of the automobile and bumper assembly. Fig. 14 shows the detailed construction of clamp 47 fastening the drawbar 31 to the bumper 48 by means of a draw-bolt 50, a spacing nut 51 and a tightening nut 52. Clamp 46 is constructed similarly to clamp 47.

Fastened to the front end of the trailer frame is a horizontally disposed supporting guide member or track 55 (Figs. 1, 2, 3, 4, 5 and 6) made arcuate to the pivot 26 (see Fig. 2), directly under which the tongue 27 may swing horizontally on pivot 26 (Fig. 1) if the triangular brace adjustable locking means to be described is positioned in unlocked condition for backing. This guide member extends beyond the trailer body at either side and is adapted to be engaged by a member on the tongue for supported sliding movement thereon.

Figure 12:
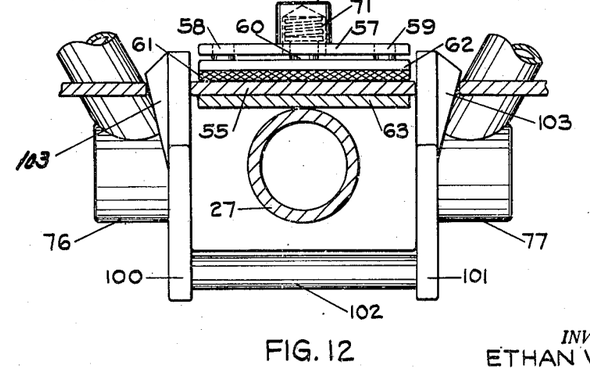
Fig. 12 is a section on the line 12—12 of Fig. 3.

Secured to the tongue is a collar 56 (Fig. 3), and bolted to the top of the collar is a lug 57 (see also Fig. 12) having floating therein by means of pins 58, 59, and 60, a brake pad 61 secured to a plate 62 in which said pins are fastened, the pins freely entering apertures in lug 57. Mounted on the top of tongue 27 is a plate 63 (Fig. 12).

The horizontal surfaces of track 55 are engaged on top by the brake pad 61 and on the bottom by plate 63 thus supporting the forward reach of the tongue in whatever position it is swung. A housing 70 fastened on lug 57, over the center aperture, contains a compression spring 71 which is designed to force plate 62 into pressure contact with supporting guide member track 55. If the tongue is swung horizontally in either direction around the rear pivot the pressure of the brake pad on the track will yieldingly tend to prevent such swing, thus providing a damping means preventing the uncontrolled yawing of the trailer if forced backward by rearward pushing on the tongue while it is not locked in alignment with the longitudinal center line of the trailer.

Figure 4:
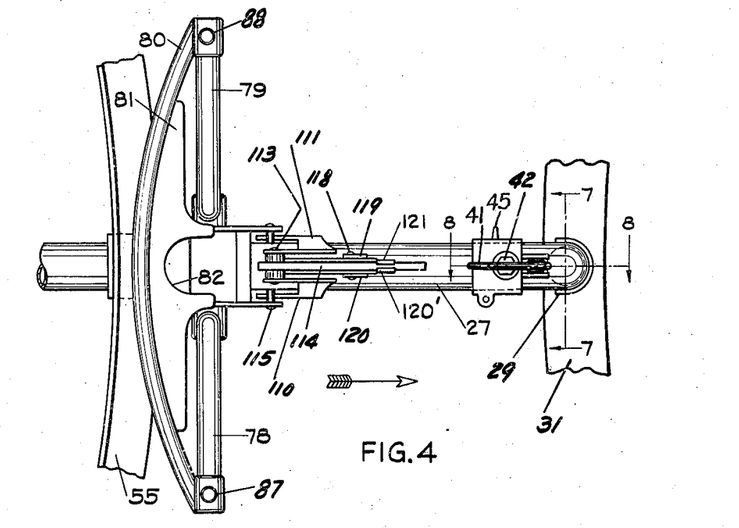
Fig. 4 is a plan view of the substance of Fig. 3.
Figure 6:
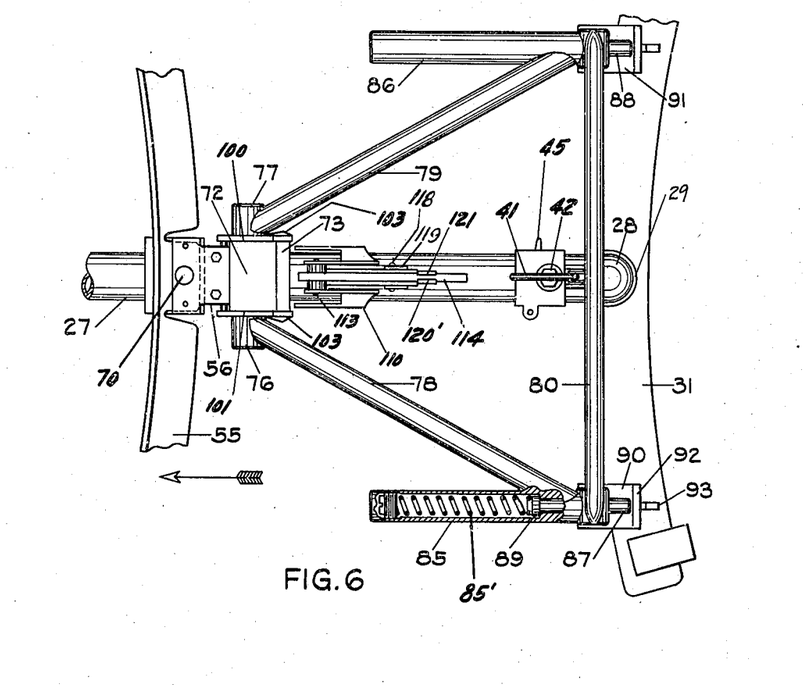
Fig. 6 is a plan view of the substance of Fig. 5.

In Fig. 6 is shown a loose collar 72 surrounding the tongue, which collar is held between collar 56 and a collar 73 fixed on the tongue. On either side of collar 72 are trunnion pins 74 and 75 (see Fig. 11) engaged by sockets in housings 76 and 77 carried on tubular side arms or legs 78 and 79 respectively of a triangular brace composed of said side arms or legs 78 and 79 and a tubular base member 80 having a bowed contour seen best in Fig. 4 where the triangular brace member is shown raised to vertical position on the trunnion pins. The triangle brace frame thus has a free pivotal movement at its apex on the trunnion pins and around the tongue to accomodate the hitch to rough ground, allowing the tractor to slant one way and the trailer another way, as will be apparent. Also shown in Fig. 4 is a plate 81 fastened to triangle brace base member 80 which has a cutout 82 so that when the triangular brace member is swung to horizontal position on its trunnion pins as shown in Fig. 6 the aperture 82 will straddle the ball socket 28.

Figure 13:
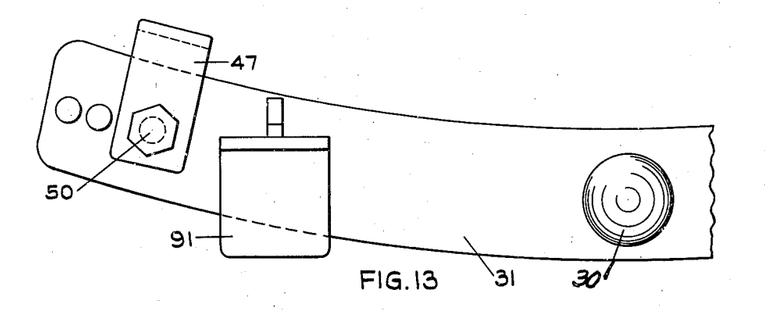
Fig. 13 is a plan view of the left end of the draw bar held by the tractor vehicle's rear bumper.

At either end of the tubular base 80 of the triangular member and formed integral with the tubular legs 78 and 79 are spring socket containers 85 and 86 each having a compression spring like spring 85′, therein forcing out respective pins 87 and 88 projecting from the sockets until the pin heads, such as pin head 89 of pin 87, meet stops within their respective sockets. On the drawbar 31 are fastened lugs 90 and 91 (see also Figs. 2 and 13) each having a vertical flange, like flange 92, and a buttress flange, like flange 93, supporting the vertical flange to form an abutment or thrust plate. The lugs 90 and 91 are so positioned on the drawbar as to be opposite pins 87 and 88 respectively when the triangular brace member is in horizontal position as shown in Fig. 6. In the horizontal position of the triangular brace member the tongue therefore is held in line with the longitudinal center line of the automobile tractor vehicle and on backward movement of the automobile, with the brace in such position, the trailer will be pushed backward and will follow the rear end of the tongue as it is pointed by the drawbar through means of the triangular member. The brake assembly bearing on the arcuate supporting guide member 55, while damping the tendency of the trailer to yaw, only yieldingly prevents the trailer from swinging on pivot 26 in making turns. The resiliently mounted pins (Fig. 6) apply the turning forces to the tongue in a cushioned manner, allowing slight horizontal swing of the tongue, to prevent breakage of the hitch through shock. It will be seen that the brace member is formed as a rigid frame with spaced abutment points to engage abutment members on a tractor vehicle. The open triangular frame forming this brace is so made of tubular material as to afford lightness and strength, but it will be apparent that other rigid devices pivoted to the tongue and braced against the tractor vehicle will perform equivalent functions and are considered within the scope of the invention.

To adjust the hitch for forward movement of the tractor vehicle and trailer, the rigid triangular brace member is moved to the vertical position, which act releases the tongue to swing around the tractor coupling and also locks the tongue 27, to the arcuate guide support member 55 so that the tongue will stay in line with the center line of the trailer and not move about pivot 26 (Fig. 1).

Figure 3:
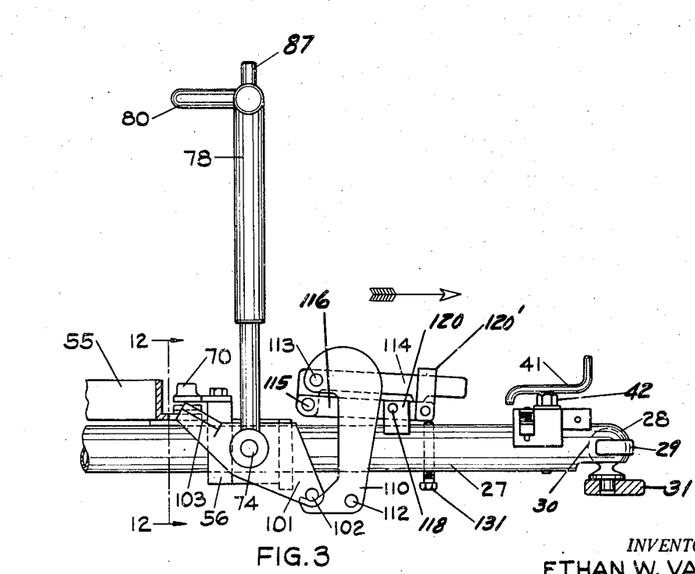
Fig. 3 is a detailed right side elevation of the hitch adjusted for forward movement of the trailer in the direction of the arrow.
Figure 11:
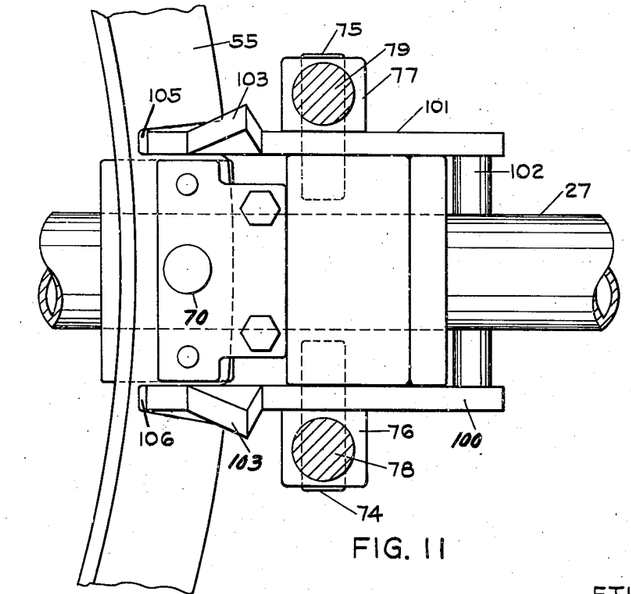
Fig. 11 is a plan view of the means for locking the tongue to the forward end of the support guide on the trailer.

Referring to Figs. 3, 6 and 11, at the apex of the triangular brace member the trunnion socket housings 76 and 77 have welded thereto respectively wedge-like cam plates 100 and 101 joined by the rod 102. Each cam plate has a cam projection, like projection 103 of cam plate 101, which when the triangular member is in vertical position engage locking formations or notches 105 and 106 in arcuate guide support track member 55, said notches being so positioned that the tongue is thereby held locked in the center line vertical plane of the trailer. In this position the trailer may be pulled forward by the ball 30 attached to the drawbar and the trailer follows the ball as a horizontal pivot point in tracking the tractor automobile.

Figure 5:
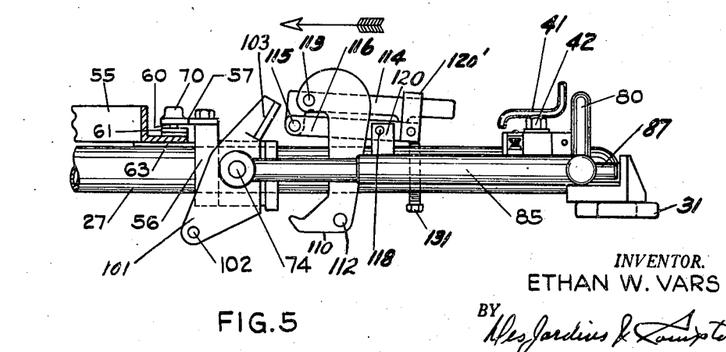
Fig. 5 is a detailed right side elevation of the hitch adjusted for backward movement of the trailer in the direction of the arrow.
Figure 9:
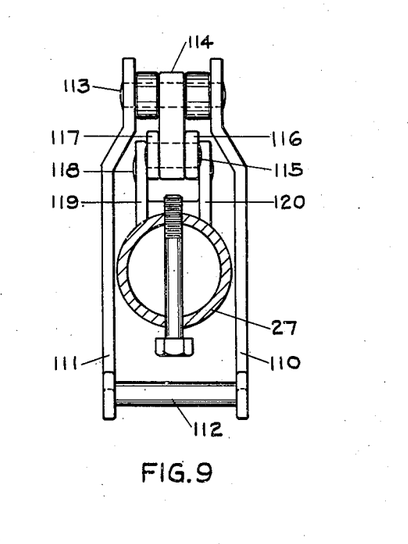
Fig. 9 is a section on the line 9—9 of Fig. 10.
Figure 10:
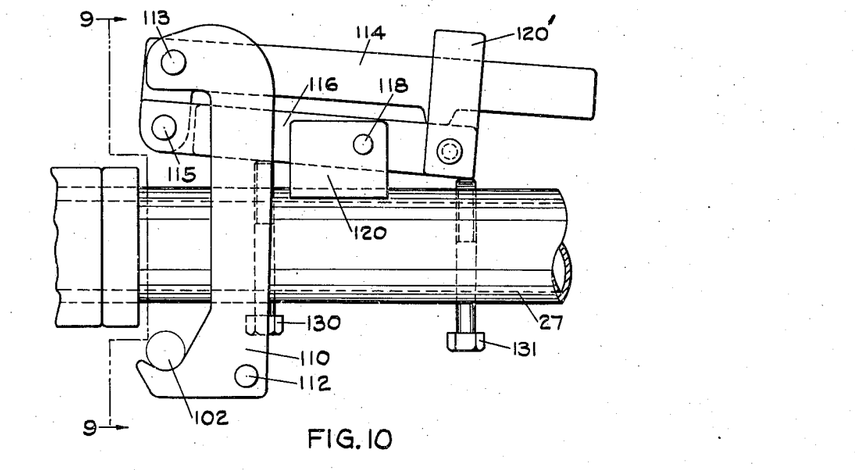
Fig. 10 is an enlarged view of a portion of the substance of Fig. 3.

Means comprising hook plates 110 and 111 (Figs. 3, 9 and 10) positioned vertically on either side of the tongue are joined by tie rod 112 underneath the tongue and are pivoted by pin 113 above the tongue to lever 114 pivoted by pin 115 to levers 116 and 117 which are pivoted by pin 118 to brackets 119 and 120 welded to the top of tongue 27. Lever 114 at its right end, as shown in Figs. 4 and 10, is clasped by a clamp made of upright pieces 120' and 121 pinned to lever 116. When the protruding right end of lever 114 (Fig. 10) is lifted out of the clamp the lower ends of plates 110 and 111 move downward releasing rod 102 (see also Figs. 5 and 12) so the triangular member may be moved to a horizontal position as shown in Fig. 5, otherwise being retained locked in vertical position as shown in Fig. 3. Screw bolts 130 and 131 piercing the tongue are for adjusting the position of lever 116 so that the members 110, 114 and 116 form a locking toggle system.

In operation, for normal forward operation of the tractor and trailer, the adjustable triangle brace frame is moved to the vertical position, shown in Fig. 1, and locked in place by the system of toggle connected levers, shown in Fig. 10. This requires first an alignment of the tongue with the longitudinal center line of the trailer which can be accomplished by swinging the trailer manually about pivot 26. For backing, a similar aligning operation may be performed manually or by forward movement of the tractor until the tongue is aligned with the longitudinal center line of the tractor, after which the rigid triangular brace frame is unlatched from its vertical position and positioned horizontally so the pins in the base end of the triangle legs abut the thrust plates as shown in Fig. 6. In this way the tongue is held in line with the center line of the tractor but is resiliently swingable to a slight degree in either direction horizontally.

It will be understood that the ends of the abutting arms of the rigid triangular brace need not necessarily be provided with the spring-urged pins, and that a solid abutment will be sufficient under most circumstances. It will further be understood that the integral member comprising the rigid triangular brace and the wedge-like locking cams is unique in that a solid coupling of the tongue and arcuate guide support member is assured by single movement of it from one position in which it abuts the tractor to another in which it engages the locking formations, and that the same member performs two functions, one in each position. It will further be apparent that the wedge-like shape of the locking cams is not essential but merely is one convenient design for making the solid coupling easier to bring about.

It will be understood that the invention is not to be deemed limited to the unessential details of construction, nor to use only with an automobile tractor vehicle, as the essence of the invention is to provide means to make the tongue integral with the tractor on backward motion, with the pivot to the rear of the trailer axle, and to make the tongue integral with the trailer on forward motion with the pivot to the front of the trailer axle.

While the form of the structure herein shown and described is admirably adapted to fulfill the stated objects of the invention, it is not intended to confine the invention to the embodiment shown as it is capable of various embodiments all coming within the scope of the claims which follow.

What is claimed is:

1. A trailer hitch including the combination of a tractor frame; a trailer frame; a transverse trailer axle having a wheel on either end; a tongue joining the rear of the tractor frame and the rear of the trailer frame at a point to the rear of the axle, said tongue joints being pivoted for horizontal motion; and adjustable triangular brace means, said triangular means having side legs and a base, said side legs being provided with spring ends, and the apex of said triangular brace being fastened to the tongue between the tractor frame and the trailer frame which when said triangular adjustable means is moved to one position makes the tongue immobile horizontally with reference to the trailer frame and which triangular member when moved to another position makes the tongue immobile horizontally with reference to the tractor frame.

2. A trailer hitch including the combination of a tractor frame; a trailer frame; a transverse trailer axle having a wheel on either end; a tongue joining the rear of the tractor frame and the rear of the trailer frame at a point to the rear of the axle, said tongue joints being pivoted for horizontal motion; and adjustable triangular brace means, having two legs and a base member, the ends of said legs being provided with springs, fastened to the tongue between the tractor frame and the trailer frame which when said adjustable triangular brace means is moved to one position makes the tongue immobile horizontally with reference to the trailer frame and which when moved to another position makes the tongue immobile horizontally with reference to the tractor frame, except for slight movement as determined by the springs, said tongue when rendered immobilized with reference to the tractor frame being in line with the center line of said tractor frame and said tongue when rendered immobilized horizontally with the trailer frame being in line with the center line of said trailer frame.

3. The combination of a trailer; a tractor; a tongue; means joining one end of the tongue to the rear of the tractor for universal movement; means joining the other end of the tongue to the rear end of the trailer for horizontal movement; trunnion pins on a loose collar on the tongue; means including a rigid triangular brace, fastened at its apex by the trunnion pins, the base of which brace is movable toward the tractor, against which the base of the triangular brace rests, to hold the tongue in line with the center line of the tractor and which brace base is movable away from the tractor to lock the tongue in line with the center line of the trailer, said locking means including cam portions on the apex of said triangular brace which cooperate with notches on a member fastened to the trailer.

4. A trailer hitch for a two wheeled trailer having the wheels mounted on either end of an axle transverse to the direction of forward and backward motion, including the combination of a tongue projecting from a horizontal movement pivot to the rear of the axle to a point in front of the trailer; socket means on the front end of the tongue to hitch it to a ball carried by a tractor; a loose collar on the tongue between the socket and the trailer said collar having trunnion pins; a triangular brace and locking member joined at its apex by the trunnion pins, so as to be movable to a vertical or horizontal position, said triangular member when in horizontal position engaging the rear of the tractor vehicle by means of the base end of the side legs of the triangular member to render the tongue immobile horizontally relative to the tractor, and said triangular member when in vertical position by means of cams attached to the apex thereof engaging notches in a member carried by the trailer to render the tongue immobile horizontally relative to the trailer, said position of immobility always holding the tongue in line with the center line of the tractor or trailer with which it is immobilized.

5. A trailer hitch including a trailer frame; a transverse axle attached to the frame intermediate the front and rear ends of the frame; a wheel mounted on either end of the axle; a vertical spindle pendent from the rear end of the trailer frame and on the longitudinal center line of the frame; a forwardly extending tongue pivoted to the spindle for horizontal movement; a track member fastened in a horizontal plane at the front end of the trailer adjacent the tongue said track being arcuate to the spindle; and a braking means between the tongue and the track whereby horizontal angular movement of the tongue on its pivotal connection to the spindle is yieldingly braked.

6. A trailer hitch including a trailer frame; a transverse axle attached to the frame intermediate the front and rear ends of the frame; a wheel mounted on either end of the axle; a vertical spindle pendent from the rear end of the trailer frame on the longitudinal center line of the frame; a forwardly extending tongue pivoted to the spindle for horizontal angular movement; a track member fastened in a horizontal plane at the front end of the trailer adjacent the tongue said track being arcuate to the spindle and having locking notches therein positioned approximately in the vertical plane in which the longitudinal center line of the frame is located; and adjustable triangular brace means carried by the tongue which means in one mode of adjustment locks the tongue to the track member by means of the notches so the tongue is fixed in line with the longitudinal center line of the frame and which in another mode of adjustment permits movement of the tongue horizontally relative to the frame.

7. A trailer hitch including a trailer frame; a transverse axle attached to the frame intermediate the front and rear ends of the frame; a tongue pivotally mounted for horizontal angular movement at the rear end of the frame and extending forwardly beyond the front end of the frame; a coupling means on the front end of the tongue whereby to attach it to a tractor vehicle for limited universal motion; a track attached to the front end of the trailer in a plane parallel to the frame said track being arcuate to the pivot on the rear end of the frame and adjacent the plane of swing of the tongue, said track having locking notches therein in a position approximately in the vertical plane of the longitudinal center line of the frame; a loose collar carried by the tongue intermediate the coupling means and the front end of the trailer; a triangular frame trunnioned at its apex to the collar, said triangular frame being so sized and positioned that when it is moved into the plane in which the tongue lies the ends of the side legs of said frame away from the apex will lie in a plane normal to the forward end of the tongue, said triangular frame having locking means engaging the notches in the track when said frame is moved on its trunnions to vertical position with reference to the plane in which the tongue lies whereby to hold the tongue rigid with the trailer frame on the longitudinal center line thereof.

8. A tractor hitch for a two wheel trailer drawn by an automobile having a rear bumper, including in combination a drawbar fastened to the rear bumper and extending approximately entirely across the rear end of the automobile; a ball fastened to the drawbar on a vertical post so as to be in line with the longitudinal center line of the automobile; a thrust plate on either end of the drawbar; a tongue coupled at its front end by a socket to the ball for limited universal motion and coupled at its other end by a pivot to the rear end of a trailer for horizontal angular motion; a track on the front end of the trailer adjacent which the tongue swings in its horizontal movement said track having locking notches therein in a position approximately in the vertical plane on the longitudinal center line of the trailer; and triangular adjustable means fastened by its apex to the portion of the tongue between the socket end thereof and where the tongue adjoins the track, which adjustable means in one position braces the side legs of the triangular means against the thrust plates to hold it in line with the longitudinal center line of the automobile and which adjustable means in another position locks the tongue to the track by said notches so the tongue is held locked in line with the longitudinal center line of the trailer, said tongue when locked with the center line of either the automobile or trailer being free to move with respect to the other.

9. A tractor hitch for a two wheeled trailer drawn by an automobile having a rear bumper, including in combination a drawbar fastened to the rear bumper and extending approximately entirely across the rear end of the automobile; a ball fastened to the drawbar on a vertical post so as to be in line with the longitudinal center line of the automobile; a thrust plate on either end of the drawbar; a tongue coupled at its front end by a socket to the ball for limited universal motion and coupled at its other end by a pivot to the rear end of a trailer for horizontal motion; a track on the front end of the trailer adjacent which the tongue swings in its horizontal movement said track having locking notches therein in a position approximately in line with the longitudinal center line of the trailer; an adjustable triangular brace means fastened by its apex to the portion of the tongue between the socket end thereof and where it adjoins the track which adjustable means in one position braces the side legs of said triangular brace against the thrust plates to hold the tongue in line with the longitudinal center line of the automobile, and which adjustable means in another position locks the tongue to the track by means of the notches so the tongue is held locked in line with the longitudinal center line of the trailer, said tongue when locked with the center line of either the automobile or trailer being free to move with respect to the other; and frictional brake means clamping the tongue to the track so that any horizontal movement of the tongue relative to the trailer is resisted.

10. A trailer hitch for a trailer having a frame, a transverse axle, and a pair of supporting wheels on the ends of said axle, comprising the combination of a tongue pivotally connected to the trailer frame, at a point in the rear of said axle, to swing in a horizontal plane; means at the forward end of said tongue for pivotally connecting it to the rear of a tractor vehicle; a triangular brace-locking member mounted on said tongue by its apex and swingable about a horizontal axis from a vertical to a horizontal position and vice versa; means carried by said triangular member for fixing said tongue in the vertical plane including the longitudinal center line of the tractor vehicle, when said member occupies its horizontal position, said means being the ends of the side legs of the triangular member, which ends have resilient abutment pieces thereon; and means carried by said triangular member for fixing said tongue in the vertical plane including the longitudinal center line of the trailer, when said member occupies its vertical position.

11. A trailer hitch for a trailer having a frame, a transverse axle, and a pair of supporting wheels on the ends of said axle, comprising the combination of a tongue pivotally connected to the trailer frame, at a point in the rear of said axle, to swing in a horizontal plane; means at the forward end of said tongue for pivotally connecting it to the rear of a tractor vehicle; a collar mounted on said tongue to swivel about the axis of said tongue; a triangular member mounted on said collar movable from a normal vertical position to a horizontal backing position and vice versa; means carried by said triangular member for fixing said tongue in approximate coincidence with the longitudinal centerline of the tractor vehicle, when said member occupies the horizontal backing position; and means carried by said triangular member for fixing said tongue in approximate coincidence with the longitudinal center line of the trailer frame, when said member occupies the normal vertical position, said last means including cam members affixed to the triangular member, which cam members cooperate with notches in a member carried by the trailer frame.

12. A trailer hitch for a trailer having a frame, a transverse axle, and a pair of supporting wheels on the ends of said axle, comprising the combination of a tongue pivotally connected to the trailer frame, at a point in the rear of said axle, to swing in a horizontal plane; means at the forward end of said tongue for pivotally connecting it to the rear of a tractor vehicle; a triangular tongue-fixing member mounted on said tongue by its apex and swingable about a horizontal axis from a vertical normal to a horizontal backing position and vice versa, the side legs of said member abutting the outer ends of the tractor vehicle on abutment pieces provided on the rear of the tractor vehicle, laterally spaced from the longitudinal center line thereof, when the member is in horizontal backing position, to fix said tongue in approximate coincidence with said longitudinal center line; and cam means carried by said member adjacent said horizontal axis for interlocking with the trailer frame, when said member is in vertical normal position, to lock the tongue against pivotal motion with repect to said trailer frame.

13. A trailer hitch for a trailer having a frame, a transverse axle, and a pair of supporting wheels on the ends of said axle, comprising the combination of a tongue pivotally connected to the trailer frame, at a point in the rear of said axle, to swing in a horizontal plane; means at the forward end of said tongue adapted to make universal connection with the rear of a tractor vehicle; a triangular member mounted on said tongue and swingable by its apex, about an axis transverse to the axis of said tongue, from vertical normal to horizontal backing position and vice versa, said member having an arm, the outer end of which is adapted to make thrust engagement with an abutment on the rear of the tractor vehicle, laterally spaced from the longitudinal center line thereof, when the member is in horizontal backing position, to fix said tongue from pivotal motion in a horizontal plane about said universal connection; and cam means, carried by said member adjacent its mounting for interlocking with the trailer frame, when said member is in vertical normal position, to lock the tongue against pivotal motion with respect to said trailer frame.

14. A trailer hitch for a trailer having a frame, a transverse axle, and a pair of supporting wheels on the ends of said axle, comprising the combination of a tongue pivotally connected to the trailer frame, at a point in the rear of said axle, to swing in a horizontal plane; means at the forward end of said tongue adapted to make universal connection with the rear of a tractor vehicle; a collar mounted on said tongue, adjacent the front end of the trailer frame, to swivel about the axis of said tongue; a triangular member pivoted on said collar to swing by its apex about an axis extending transversely of said tongue axis from vertical normal to horizontal backing position and vice versa, said member having an arm, the outer end of which is adapted to make thrust engagement with an abutment on the rear of the tractor vehicle, laterally spaced from the longitudinal center line thereof, when the member is in horizontal backing position, to fix said tongue from pivotal motion in a horizontal plane about said universal connection; and cam means, carried by said member adjacent its pivot, for interlocking with the trailer frame, when said member is in vertical normal position, to lock the tongue against pivotal motion with respect to said trailer frame.

15. A trailer hitch for a trailer having a frame, a transverse axle, and a pair of supporting wheels on the ends of said axle, comprising the combination of a tongue pivotally connected to the trailer frame, at a point in the rear of said axle, to swing in a horizontal plane; means at the forward end of said tongue adapted to make universal connection with the rear of a tractor vehicle; a track secured to the front end of said trailer frame; a collar mounted on said tongue, adjacent the front end of the trailer frame, to swivel about the axis of said tongue; and a triangular member pivoted on said collar to swing about an axis extending transversely of said tongue axis, from vertical normal to horizontal backing position and vice versa, said member having an arm, the outer end of which is adapted to make thrust engagement with an abutment on the rear of the tractor vehicle, laterally spaced from the longitudinal center line thereof, when the member is in horizontal backing position, to fix said tongue against pivotal motion in a horizontal plane about said universal connection, said member having a portion adapted to make locking engagement with said track, when the longitudinal center line of the trailer frame is in line with the tongue and said member is in vertical normal position, to lock the tongue against pivotal motion with respect to said trailer frame.

16. A trailer hitch for a trailer having a frame, a transverse axle, and a pair of supporting wheels on the ends of said axle, comprising the combination of a tongue pivotally connected to the trailer frame, at a point in the rear of said axle, to swing in a horizontal plane; means at the forward end of said tongue adapted to make universal connection with the rear of a tractor vehicle; an arcuate track secured to the front end of said trailer frame and concentric with the pivotal connection between said tongue and frame, said track having a notch therein; a collar mounted on said tongue, adjacent the front end of the trailer frame, to swivel about the axis of said tongue; a triangular member pivoted on said collar to swing by its apex about an axis extending transversely of said tongue axis, from vertical normal to horizontal backing position and vice versa, said member having an arm, the outer end of which is adapted to make thrust engagement with an abutment on the rear of the tractor vehicle, laterally spaced from the longitudinal center line, when the member is in horizontal backing position, to fix said tongue from pivotal motion in a horizontal plane about said universal connection; and a locking projection on said member adapted to engage in the notch of said track, when the member is in vertical normal position, to lock the tongue against pivotal motion with respect to said trailer frame.

17. A trailer hitch for a trailer having a frame, a transverse axle, and a pair of supporting wheels on the ends of said axle, comprising the combination of a tongue pivotally connected to the trailer frame, at a point in the rear of said axle, to swing in a horizontal plane; means at the forward end of said tongue adapted to make universal connection with the rear of a tractor vehicle; an arcuate track secured to the front end of the trailer frame and concentric with the pivotal connection between said tongue and frame, said track having a notch therein; a collar mounted on said tongue, adjacent the front end of the trailer frame, to swivel about the axis of said tongue; a triangular member pivoted on said collar to swing about an axis extending transversely of said tongue axis, from vertical normal to horizontal backing position and vice versa, said member having an arm, the outer end of which is adapted to make thrust engagement with an abutment on the rear of the tractor vehicle, laterally spaced from the longitudinal center line thereof, when the member is in horizontal backing position, to fix said tongue from pivotal motion in a horizontal plane about said universal connection; and a locking cam fast to said member and adapted to be engaged in the notch of said track, when the member is in vertical normal position, to fix the tongue against pivotal motion with respect to said trailer frame.

18. A trailer hitch including, a combination, a trailer frame; a transverse axle carrying said frame; a tractor frame member; a tongue pivotally connected to said trailer at a point in the rear of said axle, said tongue being pivoted at its other end to said tractor frame member; and means operable to a first position for permitting pivoting of said tongue on said trailer carried pivot and preventing horizontal pivoting of the tongue on the tractor carried pivot, and operable to a second position to render the trailer carried pivot immobile and at the same time freeing the tractor carried pivot for horizontal use, said means comprising a rigid triangular brace member having a base and side legs, said triangular member being pivoted at its apex, where the side legs meet, to said tongue, said triangular member in the first position, holding said tongue against pivotal movement on said tractor carried pivot by reason of the contact of the ends of the side legs of the triangular member against the tractor frame, and said triangular member when moved to the second position causing the moving of said side legs away from the tractor frame thus permitting said tongue to pivot on the tractor carried pivot, and said moving to the second position of the triangular member causing locking members thereon to couple it to the trailer frame, rendering said tongue immobile with reference to said trailer frame.

19. In a hitching mechanism, the combination of a trailer frame; a transverse axle carrying said frame; a tractor frame member; a tongue pivotally connected to said trailer frame at a point in the rear of said axle and pivoted at the other end to said tractor frame member; an arcuate track secured to the front of said trailer frame; and adjustable means, in the form of a triangular brace, for coupling said track and said tongue, said triangular adjustable means including a plurality of projections thereon for engaging notches in the arcuate track, whereby said tongue may be made rigid with said trailer frame when the adjustable means is moved in one direction, said coupling being rendered ineffective when the adjustable triangular means is moved to another direction, in which other direction the ends of the legs of the triangle are braced against the tractor frame rendering the tongue resiliently locked with the center line of the tractor member by reason of the abutment of said legs against the tractor frame, the ends of said legs having resilient means in the form of springs making said abutment resilient.

20. A trailer hitch for coupling a two-wheeled trailer to a tractor, including, in combination, a tongue pivot on the rear of the trailer; a tongue pivoted to the pivot and having a forward reach extending forwardly of the trailer; a support member attached to the forward end of the trailer for supporting the forward reach of the tongue in whatever pivoted position it is in, said member having locking formations; and locking means pivotally carried by the tongue, said locking means in one position engaging the said locking formations to hold the tongue in line with the longitudinal center line of the trailer and said locking means in another position being disengaged from the locking formations to permit the tongue to pivot.

21. A trailer vehicle including a single pair of supporting wheels; a tongue pivoted to said trailer to the rear of the wheels for transverse pivotal movement relative to the trailer, said tongue having a forward reach extending toward the front of the trailer; a guide member carried by the trailer in position to support the forward reach of the tongue in its transverse movement, said guide having locking formations therein; and locking means pivotally carried by the tongue, said locking means in one position, where the tongue is aligned with the longitudinal center line of the trailer, engaging the locking formations to positively hold the tongue so aligned, and said locking means in another position being disengaged from the locking formations to permit the tongue to pivot.

22. A trailer hitch by which the trailer may be coupled to a tractor vehicle, including, in combination, a trailer vehicle having a pair of supporting wheels on a transverse axle; a pivot mounted on the trailer, on its longitudinal center line, to the rear of the axle; a tongue pivoted to the pivot for transverse movement with respect to the trailer, said tongue having a forward reach extending in front of the trailer; an arcuate support guide secured to the front of the trailer and provided with locking formations thereon; means on the tongue for slidingly engaging the support guide so the tongue is supported in its transverse movement; a rigid member pivoted on the tongue, which member in one position engages the locking formations to hold the tongue aligned with the center line of the trailer and which member in another position disengages from the locking formations and acts on each side of the tongue as a brace to abut against a tractor vehicle to hold the tongue in alignment with the longitudinal center line of the tractor vehicle.

23. A trailer hitch, including, in combination, a trailer provided with supporting wheels; a tongue pivoted to the trailer to the rear of the wheels and extending forwardly beyond the front of the trailer, said pivot permitting transverse swinging of the tongue with respect to the trailer; a support track and guide member secured to the forward part of the trailer, said track being arcuate to the pivot, and said track having locking formations; and a rigid unitary member pivoted to the tongue, said member when pivoted in one direction engaging the locking formations to lock the tongue positively with respect to the trailer, and said member when pivoted in the opposite direction presenting abutment formations on each side of the tongue which may be braced against a tractor vehicle to hold the tongue against transverse movement about its front end with respect to the tractor vehicle.

ETHAN W. VARS.

REFERENCES CITED

The following references are of record in the file of this patent:

UNITED STATES PATENTS

| Number | Name | Date |
| --- | --- | --- |
| 1,573,320 | Kline | Feb. 16, 1926 |
| 2,061,234 | Hoflich | Nov. 17, 1936 |
| 2,355,695 | Atwood | Aug. 15, 1944 |
| 2,432,357 | Vars | Dec. 9, 1947 |